United States Patent
Abdulvahid et al.

(10) Patent No.: US 7,904,743 B2
(45) Date of Patent: Mar. 8, 2011

(54) PROPAGATION BY A CONTROLLER OF RESERVATION MADE BY A HOST FOR REMOTE STORAGE

(75) Inventors: Jasmeer Kuppavilakom Abdulvahid, Santa Clara, CA (US); Hemanth Kalluri, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 11/845,676

(22) Filed: Aug. 27, 2007

(65) Prior Publication Data

US 2009/0063892 A1    Mar. 5, 2009

(51) Int. Cl.
*G06F 11/00* (2006.01)
(52) U.S. Cl. .................... 714/3; 714/5; 714/6; 714/42
(58) Field of Classification Search .................. 714/3, 4, 714/5, 6, 11, 13, 15, 18, 42
See application file for complete search history.

(56) References Cited

U.S. PATENT DOCUMENTS

| | | | |
|---|---|---|---|
| 5,896,492 A * | 4/1999 | Chong, Jr. | 714/3 |
| 6,192,483 B1 | 2/2001 | Moiin et al. | |
| 6,304,980 B1 * | 10/2001 | Beardsley et al. | 714/6 |
| 6,782,416 B2 | 8/2004 | Cochran et al. | |
| 6,912,629 B1 * | 6/2005 | West et al. | 714/E11.122 |
| 7,058,731 B2 | 6/2006 | Kodama | |
| 7,111,084 B2 * | 9/2006 | Tan et al. | 714/4 |
| 7,421,614 B2 * | 9/2008 | Watanabe | 714/6 |
| 2002/0133735 A1 * | 9/2002 | McKean et al. | 714/5 |
| 2003/0188233 A1 * | 10/2003 | Lubbers et al. | 714/100 |
| 2004/0158668 A1 | 8/2004 | Golasky et al. | |
| 2005/0166018 A1 | 7/2005 | Miki | |
| 2005/0278465 A1 | 12/2005 | Qi | |
| 2006/0036896 A1 * | 2/2006 | Gamache et al. | 714/4 |
| 2006/0069865 A1 * | 3/2006 | Kawamura et al. | 711/114 |
| 2006/0136772 A1 | 6/2006 | Guimbellot et al. | |
| 2006/0179061 A1 | 8/2006 | D'Souza et al. | |

* cited by examiner

*Primary Examiner* — Robert Beausoliel
*Assistant Examiner* — Joseph D Manoskey
(74) *Attorney, Agent, or Firm* — Rabindranath Dutta; Konrad Raynes and Victor LLP (57) ABSTRACT

Provided are a method, system, and article of manufacture wherein a primary controller receives a request from a primary host to set reservations on a primary storage and a secondary storage, wherein the primary host, the primary controller and the primary storage are at a first site, and wherein a secondary host, a secondary controller, and the secondary storage are at a second site. The primary controller sets a first reservation on the secondary storage via a storage area network coupling the secondary storage to the primary controller, wherein the setting of the first reservation causes the secondary storage to be read only for a secondary host. The primary controller sets a second reservation on the primary storage, wherein the setting of the second reservation allows the primary host to perform read and write operations on the primary storage.

16 Claims, 4 Drawing Sheets

PROPAGATION BY A CONTROLLER OF RESERVATION MADE BY A HOST FOR REMOTE STORAGE

BACKGROUND

1. Field

The disclosure relates to a method, system, and article of manufacture for the propagation by a controller of reservation made by a host for remote storage.

2. Background

Certain information systems provide high availability for data by implementing clusters of servers. The servers in a cluster may share data storage resources, such as disks. In case of a failure of a server in a cluster, one of the operational servers can take control of the storage resources and service requests. In certain other information systems, storage controllers may provide data replication services, such as, point-in-time copy and synchronous or asynchronous controller-to-controller (remote) copy. In such systems, data can be replicated from a primary controller to a remote or secondary controller that may be hundreds of kilometers away from the primary controller, by using remote copy. Such solutions may protect the data from a disaster that affects the primary site while not necessarily ensuring continuous availability of data. In certain other information systems, data is continuously replicated from the primary to the secondary site to ensure continuous availability of data.

Certain systems may use Small Computer Systems Interface (SCSI) reservation commands to claim ownership of a disk to provide continuous availability of data. For example, when a cluster initially starts up, a first node may put a reservation on a quorum disk and the first node may become the owner of the disk. Nodes that join the cluster at a later point in time do not attempt to claim the quorum disk until the nodes that join are unable to communicate with the current quorum owner node. Since all servers in the cluster physically share the disk resources including the quorum disk, the cluster servers may have to be near each other. In case of a disaster that affects the region in which the cluster servers reside, a complete loss of data may occur. Certain other systems may also use SCSI reservation commands to manage or change remote copy states in a distributed environment with geographically separated nodes for ensuring continuous availability of data.

SUMMARY OF THE PREFERRED EMBODIMENTS

Provided are a method, system, and article of manufacture wherein a primary controller receives a request from a primary host to set reservations on a primary storage and a secondary storage, wherein the primary host, the primary controller and the primary storage are at a first site, and wherein a secondary host, a secondary controller, and the secondary storage are at a second site. The primary controller sets a first reservation on the secondary storage via a storage area network coupling the secondary storage to the primary controller, wherein the setting of the first reservation causes the secondary storage to be read only for a secondary host. The primary controller sets a second reservation on the primary storage, wherein the setting of the second reservation allows the primary host to perform read and write operations on the primary storage.

In certain embodiments, the storage area network is a first network, wherein the primary host is coupled to the secondary host over a second network. A substitution is made of the primary host by the secondary host, in response to: (i) the secondary host determining over the second network that the heartbeat of the primary host is absent; and (ii) the secondary controller determining over the first network that the primary host is unable to clear a challenge reservation made by the secondary controller on the primary storage.

In further embodiments, the primary host, the primary controller, the primary storage, the secondary host, the secondary controller, the secondary storage form a cluster. The secondary controller clears the second reservation on the primary storage over the storage area network, in response to determining, by the secondary host, that a heartbeat of the primary host is absent in an Internet Protocol (IP) network coupling the primary and the secondary host. The secondary controller sets a challenge reservation on the primary storage. The primary host is substituted by the secondary host in the cluster, in response to determining that the challenge reservation on the primary storage has not been cleared by the primary host within a predetermined interval of time.

In yet further embodiments, a determination is made by the secondary host whether a heartbeat of the primary host is present in the Internet Protocol (IP) network coupling the primary and the secondary host, in response to determining that the challenge reservation on the primary storage has been cleared by the primary host, wherein if either the first reservation or the second reservation fail an error is returned to the primary host.

In additional embodiments, the primary host is coupled to the primary controller that controls the primary storage via a first local area network at the first site. The secondary host is coupled to the secondary controller that controls the secondary storage via a second local area network at the second site. The primary host and the secondary host are adapted for communications over an Internet Protocol (IP) network, wherein the primary controller and the secondary controller are adapted for communications over the storage area network. Additionally, the first site and the second site are geographically separated by a distance of over a kilometer and data is kept synchronized between the first site and the second site.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments allow storage controllers to propagate SCSI reservations on mirrored disks across geographically separated sites, wherein the geographical separation between sites may exceed a kilometer. In certain embodiments, the storage controllers support remote mirror pairs wherein SCSI reservation on the primary disk in the pair is propagated to the remote disk by the storage controller as long as a mirror link is operational.

Figure 1:
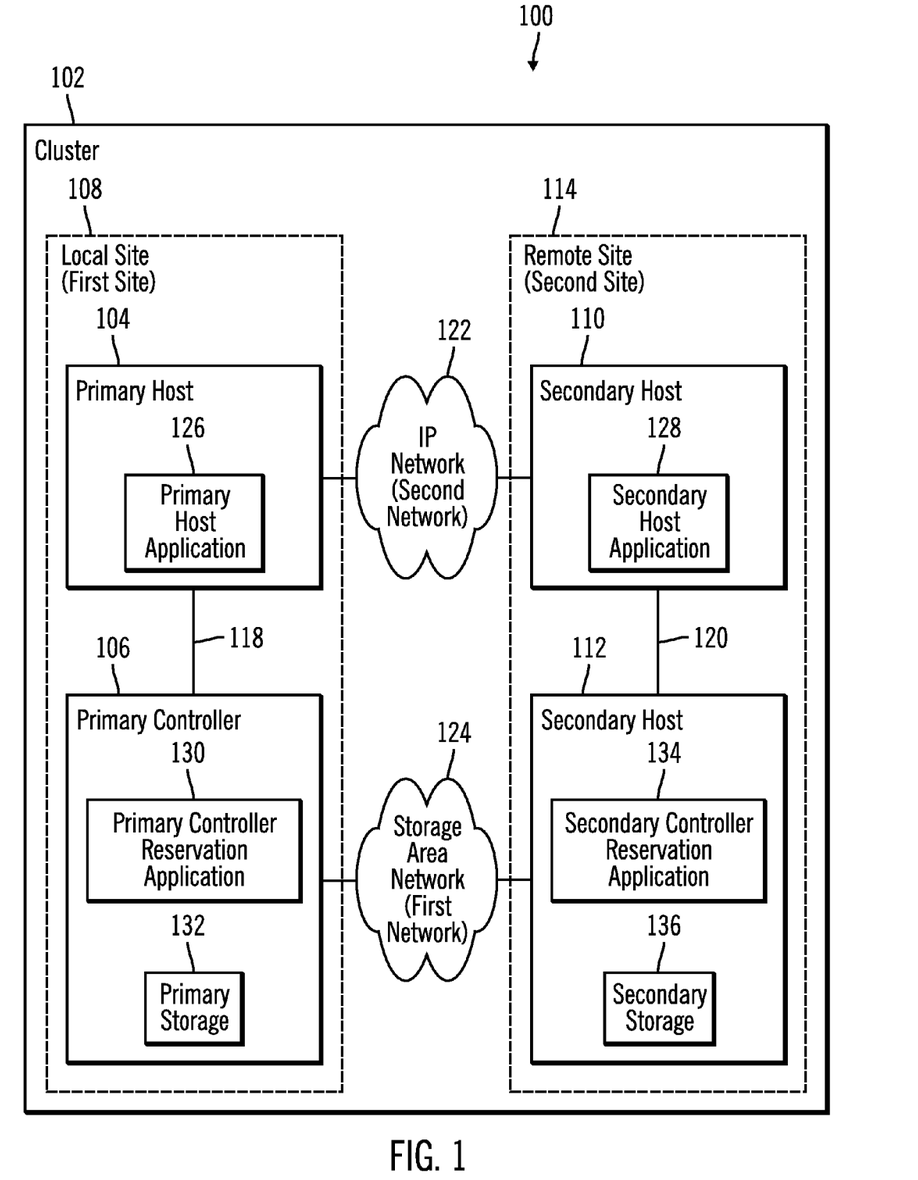
FIG. 1 illustrates a block diagram of a computing environment, in accordance with certain embodiments.

FIG. 1 illustrates a block diagram of a computing environment 100 that includes a cluster 102 comprising a primary host 104 and a primary controller 106 at a local site 108, and a secondary host 110 and a secondary controller 112 at a remote site 114. While FIG. 1 shows two hosts 104, 110 and two controllers 106, 112, in alternative embodiments a different number of hosts and controller may be included in the cluster 102. The local site 108 may also be referred to as a first site and the remote site 114 may also be referred to as a second site. The distance between the local site 108 and the remote site 114 may exceed a kilometer in certain exemplary embodiments.

The primary host 104 is coupled to the primary controller 106 via a first local area network 118 at the local site 108. The secondary host 110 is coupled to the secondary controller 112 via a second local area network 120 at the remote site 114. The primary host 104 and the secondary host 110 are adapted for communications over an Internet Protocol (IP) network 122, and the primary controller 106 and the secondary controller 112 are adapted for communications over a storage area network 124. In alternative embodiments, the networks coupling the elements shown in FIG. 1 may differ from those described. For example, in certain alternative embodiments the primary host 104 may be coupled to the secondary host 110 over a network that is not based on the Internet Protocol.

The hosts 104, 110 and the controllers 106, 112 may comprise any suitable computational platform, including those presently known in the art, such as, a server, a personal computer, a workstation, a mainframe, a midrange computer, a network appliance, a palm top computer, a telephony device, a blade computer, a hand held computer, etc.

The primary host 104 includes a primary host application 126 and the secondary host 110 includes a secondary host application 128. The primary controller 106 includes a primary controller reservation application 130 and a primary storage 132, and the secondary controller 112 includes a secondary controller reservation application 134 and a secondary storage 136. The primary storage 132 and the secondary storage 136 may comprise disks, tapes, or any other suitable storage devices known in the art.

The primary controller reservation application 130 can set reservations on the secondary storage 136 via the storage area network 124 coupling the secondary controller 112 to the primary controller 106. The primary controller reservation application 130 can also set reservations on the primary storage 132. In certain embodiments, the primary host 104 may be substituted by the secondary host 110, in response to the secondary host 110 determining over the IP network 122 that the heartbeat of the primary host 104 is absent, and the secondary controller 112 determining over the storage area network 124 that the primary host 104 is unable to clear a challenge reservation set by the secondary controller reservation application 134 on the primary storage 132.

Therefore, FIG. 1 illustrates certain embodiments in which propagation of reservations across the two sites 108, 114 allow appropriate substitution of the primary host 104 by the secondary host 110, in the event of a failure of the primary host 104.

Figure 2:
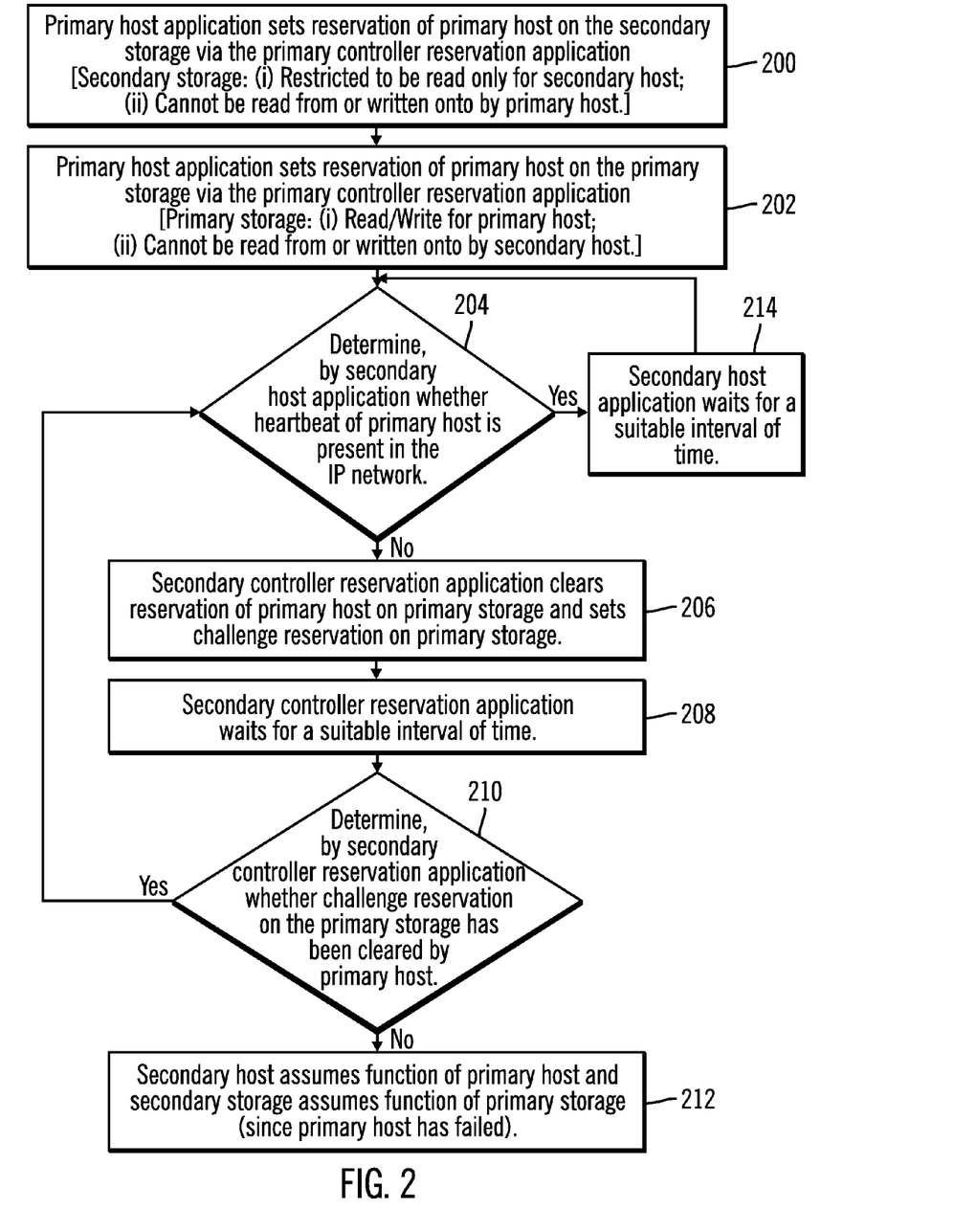
FIG. 2 illustrates first operations implemented in the computing environment, in accordance with certain embodiments.

FIG. 2 illustrates first operations implemented in the computing environment 100, in accordance with certain embodiments. The first operations may be implemented by the hosts 104, 110 and controllers 106, 112 included in the cluster 102 of the computing environment 100.

Control starts at block 200, where the primary host application 126 sets a reservation of the primary host 104 on the secondary storage 136 via the primary controller reservation application 130. As a result, the secondary storage 136 is restricted to be read only for secondary host 110, i.e., the secondary storage 136 cannot be written onto by the secondary host 110. The secondary storage 136 cannot be read from or written onto by the primary host 104.

Control proceeds to block 202, where the primary host application 126 sets reservation of the primary host 104 on the primary storage 132 via the primary controller reservation application 130. As a result, the primary storage 132 is read/write (R/W) for the primary host 104, i.e., the primary host 104 can read from or write onto the primary storage 132 following the reservation of the primary host 104 on the primary storage 132. The primary storage 132 cannot be read from or written onto by the secondary host 110.

The secondary host application 128 determines (at block 204) whether the heartbeat of the primary host 104 is present in the IP network 122. The absence of the heartbeat of the primary host 104 in the IP network 122 may be an indication that the primary host 104 is not functional. However, it is possible for the primary host 104 to be functional and for the heartbeat of the primary host 104 to be unavailable to the secondary host 110 over the IP network 122.

If the heartbeat of the primary host 104 is not present in the IP network 122, the secondary controller reservation application 134, clears (at block 206) the reservation of the primary host 104 on the primary storage 132 and sets a challenge reservation on the primary storage 132. The secondary controller reservation application 134 waits (at block 208) for a suitable interval of time. Then the secondary controller reservation application 134 determines (at block 210) whether the challenge reservation on the primary storage 132 has been cleared by the primary host 104. If not, then the failure of the primary host 104 is confirmed because in addition to the absence of the heartbeat of the primary host 104, the primary host 104 is unable to clear the challenge reservation, and the secondary host 110 assumes (at block 212) the function of primary host 104 and the secondary storage 136 assumes the function of primary storage 132.

If the challenge reservation is cleared by the primary host 104 at block 210, then control returns to block 204 because the primary host 104 is functional even though the heartbeat of the primary host 104 is unavailable over the IP network 122 to the secondary host 110.

If at block 204, a determination is made that the heartbeat of the primary host 104 is present in the IP network 122 then the secondary host application 128 waits (at block 214) for a suitable interval of time before attempting to determine once again whether the heartbeat of the primary host 104 is present in the IP network 122.

Therefore, FIG. 2 illustrates certain embodiments wherein challenge reservations are propagated across geographically separated sites to confirm the failure of a primary host 104, and in response to the failure of the primary host 104, the secondary host 110 and the secondary storage 136 are used to substitute the primary host 104 and the primary storage 132. Therefore, challenge reservations are used across geographically separated sites to maintain continuity of data.

Figure 3:
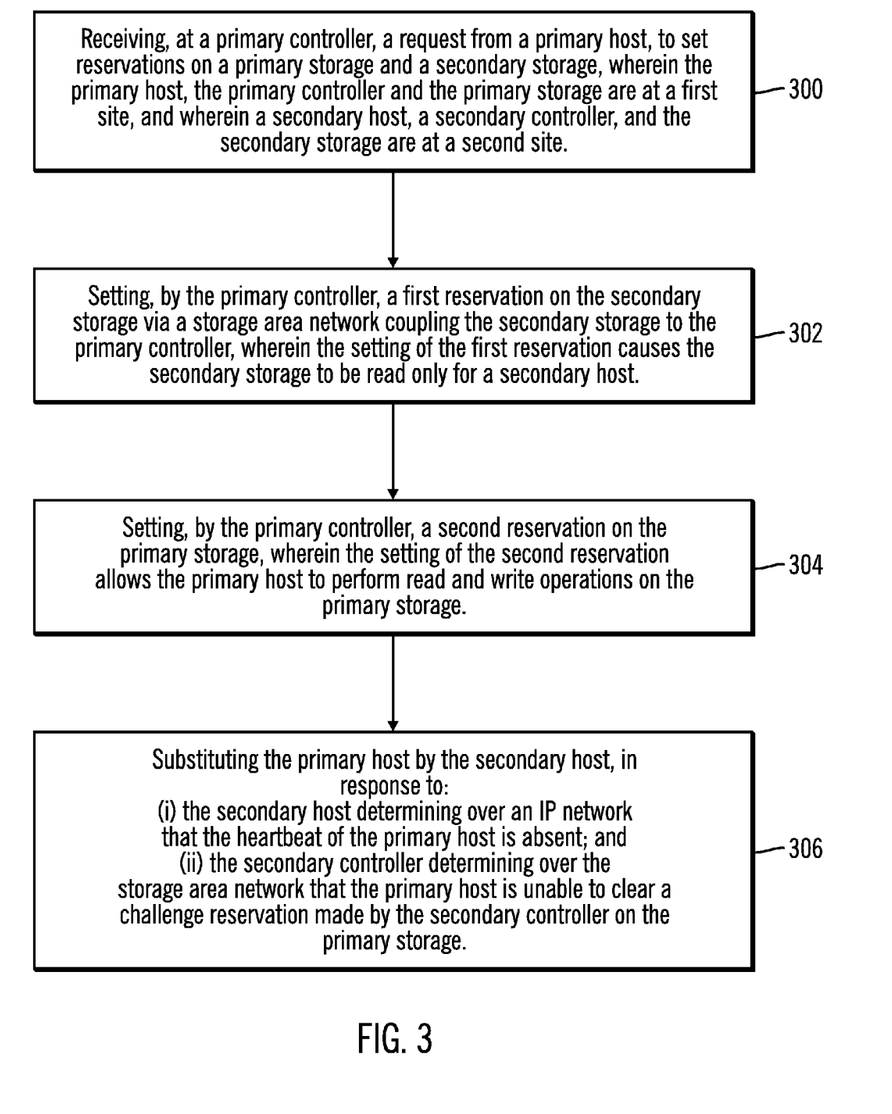
FIG. 3 illustrates second operations implemented in the computing environment, in accordance with certain embodiments.

FIG. 3 illustrates second operations implemented in the computing environment 100, in accordance with certain embodiments. The second operations may be implemented by the hosts 104, 110 and controllers 106, 112 included in the cluster 102 of the computing environment 100.

Control starts at block 300, where a primary controller 106 receives a request from a primary host 104 to set reservations on a primary storage 132 and a secondary storage 136, wherein the primary host 104, the primary controller 106 and the primary storage 132 are at a first site 108, and wherein a secondary host 110, a secondary controller 112, and the secondary storage 136 are at a second site 114.

The primary controller 106 sets (at block 302) a first reservation on the secondary storage 136 via a storage area network 124 coupling the secondary storage 136 to the primary controller 106, wherein the setting of the first reservation causes the secondary storage 136 to be read only for a secondary host 110.

Control proceeds to block 304, where the primary controller 130 sets a second reservation on the primary storage 132, wherein the setting of the second reservation allows the primary host 104 to perform read and write operations on the primary storage 132.

Control proceeds to block 306, where a substitution is made of the primary host 104 by the secondary host 110 in response to the secondary host 110 determining over the IP network 122 that the heartbeat of the primary host 104 is absent, and determining over the storage area network 124 that the primary host 104 is unable to clear a challenge reservation made by the secondary controller 112 on the primary storage 132.

Therefore, FIG. 3 illustrates certain embodiments in which a challenge reservation propagated across a storage area network 124 is used to determine whether a primary host 104 has failed. In case of failure of the primary host, a secondary host at a remote site 114 is used to take over the functions performed by the primary host 104 in order to maintain continuity of data.

Therefore, certain embodiments allow for propagation of reservation across a geographically dispersed set of hosts and controllers to determine failure at a site. Certain embodiments also allow clustering implementations to be geographically dispersed without any additional overhead on a cluster framework. Certain embodiments allow continuity of data to be maintained in the event of a failure of a primary host.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 4:
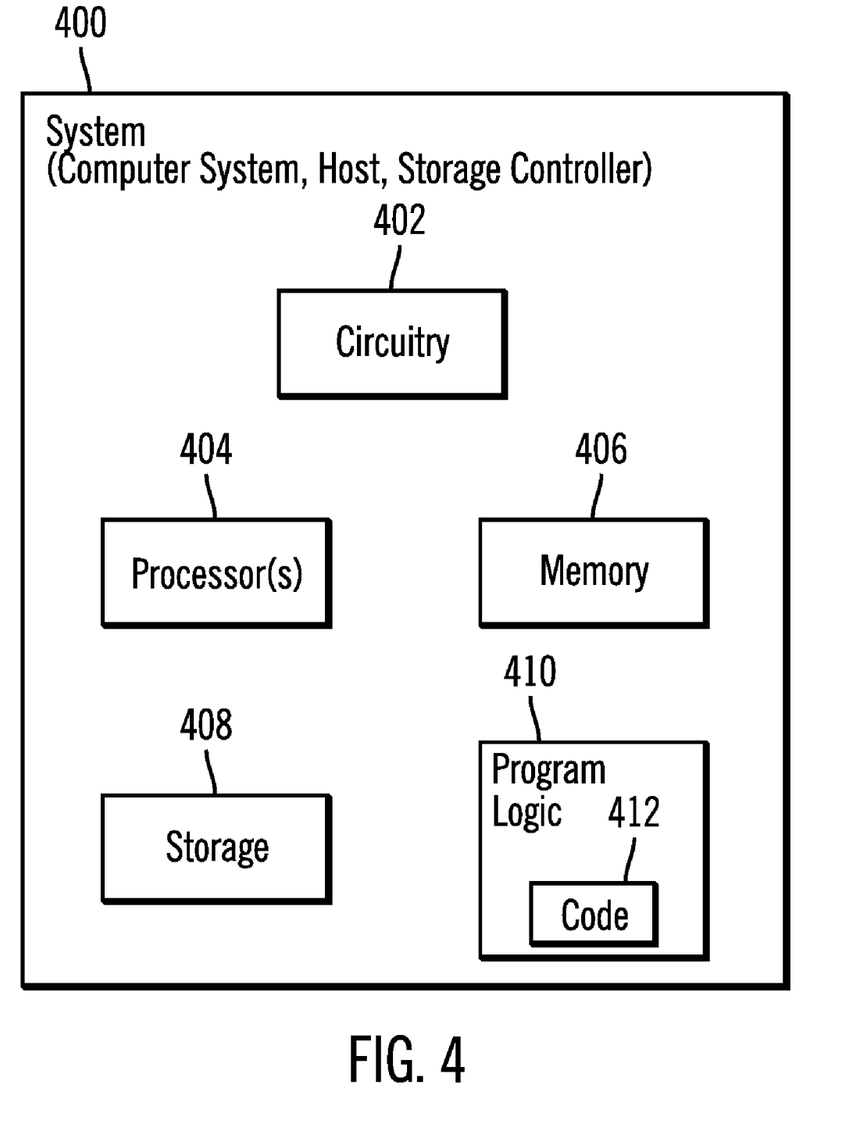
FIG. 4 illustrates a block diagram that shows certain elements that may be included in hosts and/or controllers of the computing environment, in accordance with certain embodiments.

FIG. 4 illustrates a block diagram that shows certain elements that may be included nodes 102, 104, 106, in accordance with certain embodiments. One or more of the nodes 102, 104, 106 either individually or collectively may also be referred to as a system, and may include a circuitry 402 that may in certain embodiments include a processor 404. The system 400 may also include a memory 406 (e.g., a volatile memory device), and storage 408. The storage 408 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 408 may comprise an internal storage device, an attached storage device and/or a network accessible storage device. The system 400 may include a program logic 410 including code 412 that may be loaded into the memory 406 and executed by the processor 404 or circuitry 402. In certain embodiments, the program logic 410 including code 412 may be stored in the storage 408. In certain other embodiments, the program logic 410 may be implemented in the circuitry 402. Therefore, while FIG. 4 shows the program logic 410 separately from the other elements, the program logic 410 may be implemented in the memory 406 and/or the circuitry 402.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-4 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-4 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A computer readable storage medium, wherein code stored in the computer readable storage medium when executed by a processor causes operations to be performed, the operations comprising:

receiving, at a primary controller, a request from a primary host, to set reservations on a primary storage and a secondary storage, wherein the primary host, the primary controller and the primary storage are at a first site, and wherein a secondary host, a secondary controller, and the secondary storage are at a second site, wherein the primary host is coupled to the primary controller via a first local area network at the first site, and the secondary host is coupled to the secondary controller via a second local area network at the second site;

setting, by the primary controller, a first reservation on the secondary storage via a storage area network coupling the secondary storage to the primary controller, wherein the setting of the first reservation causes the secondary storage to be read only for a secondary host and wherein the setting of the first reservation prevents the secondary storage to be read from or written onto by the primary host; and setting, by the primary controller, a second reservation on the primary storage, wherein the setting of the second reservation allows the primary host to perform read and write operations on the primary storage, wherein the setting of the second reservation prevents the primary storage to be read from or written onto by the secondary host, wherein the storage area network is a first network, wherein the primary host is coupled to the secondary host over a second network, the operations further comprising:

substituting the primary host by the secondary host, in response to:
the secondary host determining over the second network that the heartbeat of the primary host is absent; and
the secondary controller determining over the first network that the primary host is unable to clear a challenge reservation made by the secondary controller on the primary storage, subsequent to the secondary host determining over the second network that the heartbeat of the primary host is absent.

2. The computer readable storage medium of claim 1, wherein the primary host, the primary controller, the primary storage, the secondary host, the secondary controller, the secondary storage form a cluster.

3. The computer readable storage medium of claim 2, wherein if either the first reservation or the second reservation fails an error is returned to the primary host.

4. The computer readable storage medium of claim 1,
wherein the primary host and the secondary host are adapted for communications over an Internet Protocol (IP) network that is the second network;
wherein the primary controller and the secondary controller are adapted for communications over the storage area network that is first network; and
wherein the first site and the second site are geographically separated by a distance of over a kilometer and data is kept synchronized between the first site and the second site.

5. A method, comprising:
receiving, at a primary controller, a request from a primary host, to set reservations on a primary storage and a secondary storage, wherein the primary host, the primary controller and the primary storage are at a first site, and wherein a secondary host, a secondary controller, and the secondary storage are at a second site, wherein the primary host is coupled to the primary controller via a first local area network at the first site, and the secondary host is coupled to the secondary controller via a second local area network at the second site;

setting, by the primary controller, a first reservation on the secondary storage via a storage area network coupling the secondary storage to the primary controller, wherein the setting of the first reservation causes the secondary storage to be read only for a secondary host, and wherein the setting of the first reservation prevents the secondary storage to be read from or written onto by the primary host; and setting, by the primary controller, a second reservation on the primary storage, wherein the setting of the second reservation allows the primary host to perform read and write operations on the primary storage, wherein the setting of the second reservation prevents the primary storage to be read from or written onto by the secondary host, wherein the storage area network is a first network, wherein the primary host is coupled to the secondary host over a second network, the operations further comprising:

substituting the primary host by the secondary host, in response to:
- the secondary host determining over the second network that the heartbeat of the primary host is absent; and
- the secondary controller determining over the first network that the primary host is unable to clear a challenge reservation made by the secondary controller on the primary storage, subsequent to the secondary host determining over the second network that the heartbeat of the primary host is absent.

6. The method of claim 5, wherein the primary host, the primary controller, the primary storage, the secondary host, the secondary controller, the secondary storage form a cluster.

7. The method of claim 6, wherein if either the first reservation or the second reservation fails an error is returned to the primary host.

8. The method of claim 5,
wherein the primary host and the secondary host are adapted for communications over an Internet Protocol (IP) network that is the second network;
wherein the primary controller and the secondary controller are adapted for communications over the storage area network that is the first network; and
wherein the first site and the second site are geographically separated by a distance of over a kilometer and data is kept synchronized between the first site and the second site.

9. A primary controller, comprising:
a memory; and
a processor coupled to the memory, wherein the processor performs operations, the operations comprising:
(i) receiving, at the primary controller, a request from a primary host, to set reservations on a primary storage and a secondary storage, wherein the primary host, the primary controller and the primary storage are at a first site, and wherein a secondary host, a secondary controller, and the secondary storage are at a second site, wherein the primary host is coupled to the primary controller via a first local area network at the first site, and the secondary host is coupled to the secondary controller via a second local area network at the second site;
(ii) setting, by the primary controller, a first reservation on the secondary storage via a storage area network coupling the secondary storage to the primary controller, wherein the setting of the first reservation causes the secondary storage to be read only for a secondary host, and wherein the setting of the first reservation prevents the secondary storage to be read from or written onto by the primary host; and
(iii) setting, by the primary controller, a second reservation on the primary storage, wherein the setting of the second reservation allows the primary host to perform read and write operations on the primary storage, wherein the setting of the second reservation prevents the primary storage to be read from or written onto by the secondary host, wherein the storage area network is a first network, wherein the primary host is coupled to the secondary host over a second network, and wherein the primary host is substituted by the secondary host, in response to:
- the secondary host determining over the second network that the heartbeat of the primary host is absent; and
- the secondary controller determining over the first network that the primary host is unable to clear a challenge reservation made by the secondary controller on the primary storage, subsequent to the secondary host determining over the second network that the heartbeat of the primary host is absent.

10. The primary controller of claim 9, wherein the primary host, the primary controller, the primary storage, the secondary host, the secondary controller, the secondary storage form a cluster.

11. The primary controller of claim 10, wherein if either the first reservation or the second reservation fails an error is returned to the primary host.

12. The primary controller of claim 9,
wherein the primary host and the secondary host are adapted for communications over an Internet Protocol (IP) network that is the second network;
wherein the primary controller and the secondary controller are adapted for communications over the storage area network that is the first network; and
wherein the first site and the second site are geographically separated by a distance of over a kilometer and data is kept synchronized between the first site and the second site.

13. A method for deploying computing infrastructure, comprising integrating machine-readable code into a machine, wherein the code in combination with the machine is capable of performing:
receiving, at a primary controller, a request from a primary host, to set reservations on a primary storage and a secondary storage, wherein the primary host, the primary controller and the primary storage are at a first site, and wherein a secondary host, a secondary controller, and the secondary storage are at a second site, wherein the primary host is coupled to the primary controller via a first local area network at the first site, and the secondary host is coupled to the secondary controller via a second local area network at the second site;
setting, by the primary controller, a first reservation on the secondary storage via a storage area network coupling the secondary storage to the primary controller, wherein the setting of the first reservation causes the secondary storage to be read only for a secondary host, and wherein the setting of the first reservation prevents the secondary storage to be read from or written onto by the primary host; and
setting, by the primary controller, a second reservation on the primary storage, wherein the setting of the second reservation allows the primary host to perform read and write operations on the primary storage, wherein the setting of the second reservation prevents the primary storage to be read from or written onto by the secondary host, wherein the storage area network is a first network, wherein the primary host is coupled to the secondary host over a second network, the operations further comprising:

substituting the primary host by the secondary host, in response to:
- the secondary host determining over the second network that the heartbeat of the primary host is absent; and
- the secondary controller determining over the first network that the primary host is unable to clear a challenge reservation made by the secondary controller on the primary storage, subsequent to the secondary host determining over the second network that the heartbeat of the primary host is absent.

14. The method for deploying computing infrastructure of claim 13, wherein the primary host, the primary controller, the primary storage, the secondary host, the secondary controller, the secondary storage form a cluster.

15. The method for deploying computing infrastructure of claim 14, wherein if either the first reservation or the second reservation fails an error is returned to the primary host.

16. The method for deploying computing infrastructure of claim 13,
- wherein the primary host and the secondary host are adapted for communications over an Internet Protocol (IP) network that is the second network;
- wherein the primary controller and the secondary controller are adapted for communications over the storage area network that is the first network; and
- wherein the first site and the second site are geographically separated by a distance of over a kilometer and data is kept synchronized between the first site and the second site.

* * * * *